(12) United States Patent
Stillman et al.

(10) Patent No.: US 7,466,800 B1
(45) Date of Patent: Dec. 16, 2008

(54) METHOD AND SYSTEM OF VOICE ACTIVATED DIALING USING AN INTELLIGENT PERIPHERAL IN AN ADVANCE INTELLIGENT NETWORK

(75) Inventors: Scott T. Stillman, Peachtree, GA (US); Paul Wilson, Suwanee, GA (US); Xiaofeng Gao, Alpharetta, GA (US)

(73) Assignee: AT&T Intellectual Property I, L.P., New York, NY (US)

( * ) Notice: Subject to any disclaimer, the term of this patent is extended or adjusted under 35 U.S.C. 154(b) by 275 days.

(21) Appl. No.: 10/033,627

(22) Filed: Dec. 27, 2001

Related U.S. Application Data (60) Provisional application No. 60/317,723, filed on Sep. 6, 2001.

(51) Int. Cl.
*H04M 1/64* (2006.01)
(52) U.S. Cl. ............ 379/88.03; 379/88.16; 379/201.02; 379/212.01; 379/221.11
(58) Field of Classification Search ... 379/88.01–88.03, 379/88.04, 88.07, 201.02, 212.01, 88.16, 379/67.1, 219, 408, 221.09, 221.11
See application file for complete search history.

(56) References Cited

U.S. PATENT DOCUMENTS

| | | | |
|---|---|---|---|
| 5,583,920 A * | 12/1996 | Wheeler, Jr. ............. | 379/88.01 |
| 5,740,237 A | 4/1998 | Malik et al. ............. | 379/211.02 |
| 5,974,131 A | 10/1999 | Malik ....................... | 379/15.01 |
| 6,005,889 A | 12/1999 | Chung et al. ............. | 375/140 |
| 6,018,574 A | 1/2000 | Malik ........................ | 379/219 |
| 6,023,505 A | 2/2000 | Moquin ..................... | 379/229 |
| 6,233,316 B1 * | 5/2001 | Schier et al. ............. | 379/88.03 |
| 6,665,377 B1 * | 12/2003 | McKinley et al. ........ | 379/88.01 |
| 6,681,008 B2 * | 1/2004 | Bolduc et al. ............. | 379/222 |
| 6,795,543 B1 * | 9/2004 | Cartier et al. ............. | 379/219 |
| 6,813,348 B1 * | 11/2004 | Stillman et al. .......... | 379/221.08 |
| 6,865,403 B1 * | 3/2005 | Averkamp .................. | 455/564 |
| 7,088,987 B1 * | 8/2006 | Espejo et al. .............. | 455/408 |
| 7,099,441 B2 * | 8/2006 | Crockett et al. .......... | 379/88.02 |

* cited by examiner

*Primary Examiner*—MD S Elahee (57) ABSTRACT

A system and method for voice activated dialing (VAD) using an intelligent peripheral (IP), such as a service circuit node (SCN) in an Advanced Intelligent Network (AIN). This invention preserves subscriber preferences for certain attributes including preferred interexchange carrier (PIC) and billing information, without the need for data replication within either the IP or the service switching point (SSP) hosting the IP. Additionally, call routing within the network is optimized and the need for double trunking is eliminated because the IP drops the call back to the originating SSP, from which the call is then routed.

30 Claims, 5 Drawing Sheets

METHOD AND SYSTEM OF VOICE ACTIVATED DIALING USING AN INTELLIGENT PERIPHERAL IN AN ADVANCE INTELLIGENT NETWORK

This application claims the benefit of U.S. Provisional Application No. 60/317,723 filed Sep. 6, 2001, which document is incorporated herein by reference.

FIELD OF THE INVENTION

The invention generally relates to the field of telecommunications. The invention particularly relates to voice activated dialing, with respect to originating a communication, utilizing an intelligent peripheral (IP), such as a service circuit node (SCN), in an Advanced Intelligent Network (AIN).

BACKGROUND OF THE INVENTION

As the world of telecommunications becomes increasingly more sophisticated, society reaps the benefits through new, improved, and/or enhanced telecommunication services, as well as more service choices. These enhanced telecommunication services include voice mail, audio name screening, flexible call forwarding, deluxe calling name delivery, and voice activated dialing (VAD) to name a few. These enhanced telecommunication services are available to a user of a modem public switched telephone network (PSTN) and are considered valuable services by many subscribers because they enhance conventional telephone service.

For example, when the VAD service is activated by a subscriber or customer, the VAD service prompts the subscriber to utter a word, phrase, or term and translates that speech into a destination calling line number that corresponds to the desired called party. Typically, the subscriber must activate the VAD service by entering a feature code or dialing a feature directory number. Once the speech recognition is performed, an outbound call is placed through the PSTN, which bridges the call between the subscriber and the called party and occupies two ports in the intelligent peripheral (IP) platform providing the VAD service. This ties up network resources over a potentially large area. For example, the IP platform supporting the VAD service could be in California, the subscriber in Virginia, and the called party in Maine.

Bridging the call in the manner described above does not preserve subscriber billing and interexchange carrier (IXC) preferences. The freedom to choose among a variety of IXCs has become an important aspect of modem telephone service. An IXC is a telephone company that provides connections between local exchanges in different geographic areas. IXCs are commonly referred to as "long-distance carriers" and include AT&T, MCI, Sprint, and others. IXCs provide inter-LATA service as described in the Telecommunications Act of 1996. LATA (local access and transport area) is a term in the U.S. for a geographic area covered by one or more local telephone companies, which are referred to as local exchange carriers (LECs). A connection between two local exchanges within the LATA is referred to as intraLATA. A connection between a carrier in one LATA to a carrier in another LATA is referred to as interLATA. Because of increased competition and regulatory mandate, it has become significantly more important to preserve a subscriber's billing and IXC preferences for each call originated by the subscriber.

When a calling party picks up a telephone on a subscriber's line and dials a directory number, the subscriber's line carries the communication to a central office switch, or service switching point (SSP), that services the subscriber's line. The central office switch interprets the digits dialed by the calling party and routes the communication to a terminating station, such as a telephone associated with the dialed directory number. The central office switch thus serves as a gateway between the subscriber's line and the local exchange carrier's local exchange network. The central office switch also serves as a gateway between the subscriber's line and a plurality of long distance networks operated by a plurality of long distance carriers.

When the central office switch receives a long distance communication originating on the subscriber's line, the central office switch retrieves the subscriber's long distance carrier-of-record code from a database maintained at the central office switch. Typically, the central office switch responds to the subscriber's long distance carrier-of-record code by physically routing the communication through the long distance network operated by the long distance carrier-of-record.

However, this process is not as simple when the subscriber wishes to activate certain types of assistance, such as, for example, VAD service, when originating a call. Typically, the IP, or service circuit node (SCN), where the assistance is activated would complete the call to the called party and bridge the subscriber and the called party, but this would not preserve subscriber preferences because the outbound leg is originating with the SCN not the subscriber.

Accordingly, there is a need for a method and system of voice activated dialing that preserves subscriber billing and IXC preferences. There is also a need for a method and system of voice activated dialing that does not require double trunking from the IP back through the PSTN.

SUMMARY OF THE INVENTION

The present invention satisfies the above-described needs by providing a system and method for voice activated dialing (VAD) with respect to call origination, using an intelligent peripheral (IP), such as a service circuit node (SCN), in an Advanced Intelligent Network (AIN). Generally described, an embodiment of the present invention provides a method and system for VAD using an IP in the AIN connected to the PSTN. Advantageously, this invention preserves subscriber preferences for certain attributes including preferred interexchange carrier (PIC) and billing information, without the need for data replication within either the IP or the service switching point (SSP) hosting the IP. In an embodiment, the present invention uses an IP, such as a service circuit node (SCN) with voice recognition and processing capabilities, to provide assistance in the origination of a call on behalf of a customer or subscriber.

In an embodiment, the AIN has Generic Requirements 1129 (GR-1129) capabilities, which is understood by those skilled in the art. A subscriber initiates a call or communication to a called party using VAD. One manner in which the subscriber may access VAD is by dialing a feature code such as *TALK or #411. Upon encountering a trigger (e.g., off hook), the SSP serving the subscriber sends a message to the service control point (SCP) serving the subscriber. The SCP recognizes that the subscriber subscribes to VAD, and thus instructs the SSP to route the call to the IP.

Once a call path is established between the subscriber and the IP, the IP prompts the subscriber for speech to identify who the subscriber would like to call. The IP then translates that speech into a destination calling line number that corresponds to the desired called party. The destination calling line number is then sent by the IP to the SCP, via the SSPs serving the IP and the subscriber. In an alternate embodiment that does not require the AIN to have GR-1129 capabilities, the IP sends the destination calling line number (or other identifying information) to the SCP via a TCP/IP (Transmission Control Protocol/Internet Protocol) connection.

The call path between the IP and the subscriber is then dropped, and the SCP instructs the SSP serving the subscriber to complete the call to the destination calling line number. Thus, call routing within the network is optimized and the need for double trunking is eliminated because the IP drops the call back to the SSP and SCP serving the subscriber, from where the call is then routed to the called party.

These and other objects, features, and advantages of the present invention may be more clearly understood and appreciated from a review of the following detailed description of the disclosed embodiments and by reference to the appended drawings.

DETAILED DESCRIPTION OF THE INVENTION

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
| --- | --- |
| AIN | Advanced Intelligent Network |
| DTMF | Dual Tone Multi-Frequency |
| GR-1129 | Generic Requirements 1129 |
| IP | Intelligent Peripheral |
| ISDN | Integrated Service Digital Network |
| IXC | Interexchange Carrier |
| LATA | Local Access and Transport Area |
| LEC | Local Exchange Carrier |
| PIC | Preferred Interexchange Carrier |
| PRI | Primary Rate Interface |
| PSTN | Public Switched Telephone Network |
| SCN | Service Circuit Node |
| SCP | Service Control Point |
| SMS | Service Management System |
| SPA | Service Package Application |
| SS7 | Signaling System 7 |
| SSP | Service Switching Point |
| STP | Signal Transfer Point |
| TCAP | Transaction Capabilities Application Part |
| TCP/IP | Transmission Control Protocol/Internet Protocol |
| VAD | Voice Activated Dialing |

Figure 1:
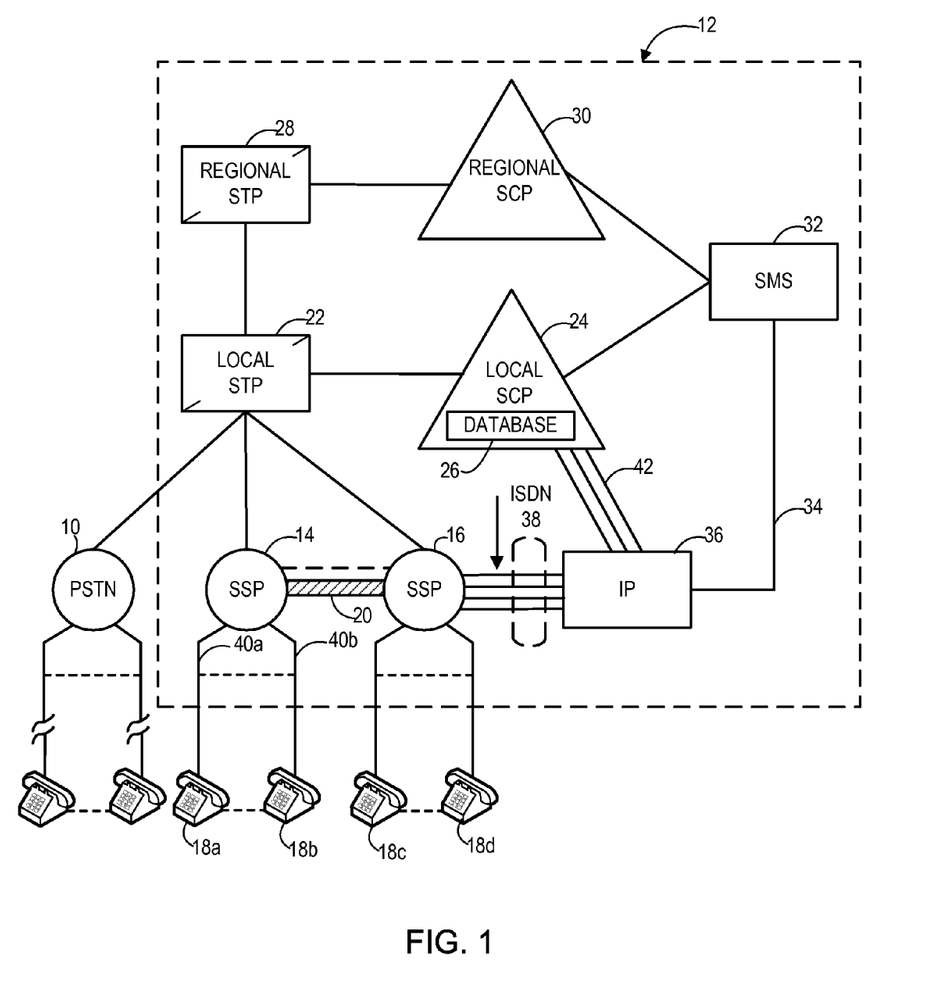
FIG. 1 illustrates an exemplary environment and a block diagram of an exemplary embodiment of the present invention.

Exemplary Environment as Used with Exemplary Embodiments—FIG. 1

FIG. 1 is a diagram of an exemplary embodiment and exemplary environment for operation of methods and systems of the present invention. Connected to a public switched telephone network (PSTN) 10, an exemplary environment is an Advanced Intelligent Network (AIN) 12. For brevity, only a basic explanation of AIN 12 is provided. Where AIN 12 operates or is composed differently in an important aspect from that which would be understood by those skilled in the art, additional details are provided herein. For further information regarding the referenced AIN 12 and aspects thereof, the interested reader is referred to the commonly assigned patent to Weisser, U.S. Pat. No. 5,430,719, which is incorporated herein by reference.

AIN 12 includes a variety of interconnected network elements. A group of such network elements includes the plurality of central offices which are indicated as service switching points (SSPs) 14 and 16 in FIG. 1. An SSP typically includes switch functionality, but also includes other functionality so as to communicate with other AIN elements as those skilled in the art understand. As further illustrated in FIG. 1, SSPs 14 and 16 have a plurality of subscriber lines, or calling lines, connected thereto. Each SSP serves a designated group of calling lines, and thus, the SSP that serves a particular calling line may be referred to as its serving SSP. For example, SSP 14 serves calling lines 40a and 40b. Each calling line is connected typically to a piece of terminating equipment including a plurality of telephones individually referenced as 18a, 18b, 18c, and 18d. Although telephones are illustrated as the pieces of terminating equipment in FIG. 1, those skilled in the art will understand that such pieces include other telecommunication devices such as facsimile machines, computers, modems, etc.

Pursuant to a preferred embodiment, each active calling line in an AIN is assigned a multi-digit calling line number. In the U.S., the calling line number typically consists of ten digits. In the description of the present invention, the term "calling line number" is used in its generally understood meaning to be the number which is dialed or input by a caller or source and used by the network to route the communication so as to reach a piece of terminating equipment on a calling line associated with the dialed calling line number. A calling line number is commonly referred to as a telephone number or a directory number.

SSPs 14 and 16 are interconnected by a plurality of trunk circuits 20. These are the voice path trunks that interconnect the SSPs to connect communications. The term "communication" or "call" is used herein to include all messages that may be exchanged between a caller (or calling party or originating party or subscriber) and a called party or destination in the network illustrated in FIG. 1.

Each of SSPs 14 and 16 is connected to another type of AIN element referred to as a local signal transfer point (STP) 22 via respective data links using the Signaling System 7 (SS7) protocol, which is well known in the art. Much of the intelligence of the AIN resides in yet another type of AIN element referred to as a local service control point (SCP) 24 that is connected to STP 22 over an SS7 data link. Among the functions performed by SCP 24 are the maintenance of network databases and subscriber databases as represented collectively by databases 26. Databases 26 may be used in providing telecommunication services to a subscriber. Typically, SCP 24 includes service package applications (SPAs) that are used in connection with or as part of databases 26 in the application of telecommunication services or enhanced features to calling lines.

The local STP 22 may be connected to other network elements of AIN 12 through a regional STP 28, which in turn may be connected to a regional SCP 30. Both regional SCP 30 and local SCP 24 are connected via respective data links to a service management system (SMS) 32. SMS 32 interfaces to business offices of the local exchange carrier (LEC) and interexchange carriers (IXCs).

In order to keep the processing of data and calls as simple as possible, a relatively small set of triggers is defined at the SSPs for each call. There are three types of triggers: subscribed (line), group, and office. With regard to the present invention, a trigger in the AIN is an event associated with a particular calling line (i.e., subscribed) that generates a packet to be sent to an SCP. The trigger causes the SCP to query its databases or service package applications for processing instructions with respect to the particular call. The results are sent back to the SSP in a response from SCP 24 through STP 22. The return packet includes instructions to the SSP as to how to process the call. The instructions may be to tell the SSP to take some special action as a result of a customized calling service or enhanced feature. In response, the SSP moves through its call states, collects the called digits, and generates further packets that are used to set up and route the call. Similar devices for routing calls among various local exchange carriers are provided by regional STP 28 and regional SCP 30.

SMS 32 also is connected via a data link 34 to one or more intelligent peripherals such as the illustrated intelligent peripheral (IP) 36. In an exemplary environment, IP 36 may be a service circuit node (SCN). By this data link 34, SMS 32 provides IP 36 with information relating to new subscribers and updates for existing subscribers, and with information relating to network operations such as new services, upgrades to existing services, measurements, audits, and maintenance. The IP 36 that receives information from SMS 32 may be one of may kinds of elements used in telecommunication services. IP 36 includes voice and dual tone multi-frequency (DTMF) signal recognition devices and voice synthesis devices.

In addition, IP 36 is connected to one or more (but usually only a few) SSPs via Integrated Service Digital Network (ISDN) links 38 as shown by the connection to SSP 16. Optionally, IP 36 may be connected to one or more SCPs via a TCP/IP connection, such as TCP/IP connection 42 which connects IP 36 to SCP 24.

Figure 2:
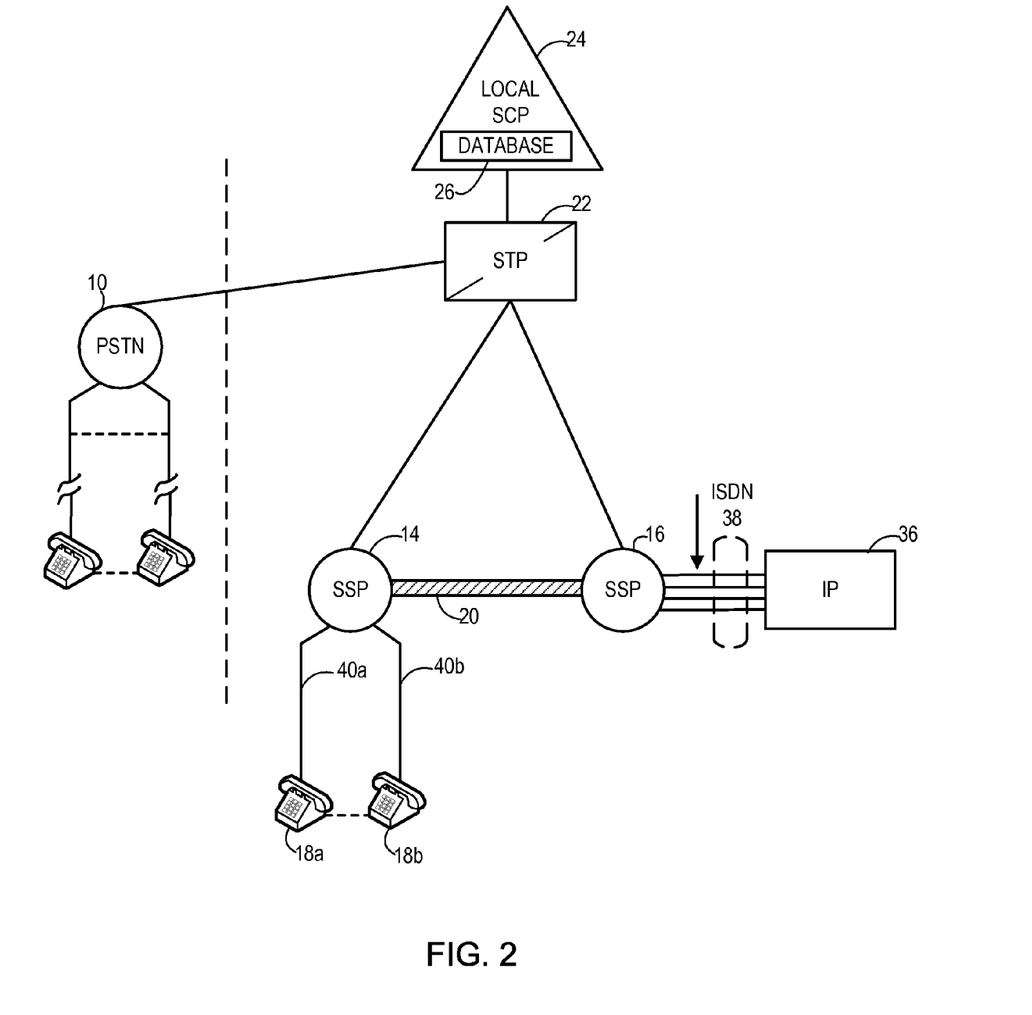
FIG. 2 is a block diagram of an exemplary embodiment operating in the exemplary environment in accordance with the present invention.
Figure 3:
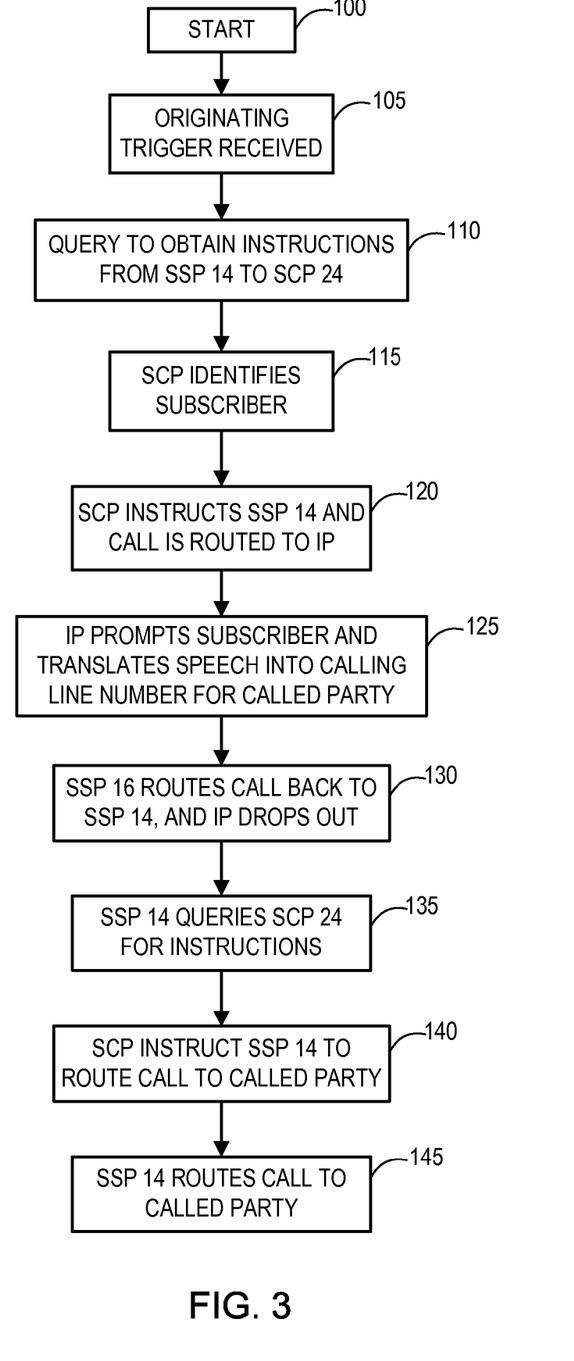
FIG. 3 is a flow diagram illustrating an exemplary method of operation of the present invention.

First Exemplary Embodiment for Voice Activated Dialing Using an Intelligent Peripheral—FIGS. 2 and 3

Turning now to FIG. 2, an exemplary operation of the present invention is described in the context of a subscriber or calling party who has subscribed to voice activated dialing (VAD) service using the service for placing a call to a called party. The inventive system uses an IP, such as a service circuit node (SCN) with voice recognition and processing capabilities, to provide assistance in the origination of a call on behalf of a customer or subscriber. The present invention preserves certain attributes including IXC and billing information without the need for data replication or complex logic within either the IP or the SSP hosting the IP. Additionally, call routing within the network is optimized. The inventive method eliminates the need for double trunking, and drops the call back to the originating SSP, from which the call is then routed to the called party.

This embodiment provides VAD using the AIN with Generic Requirements 1129 (GR-1129) capabilities, which is understood by those skilled in the art. GR-1129 is a specification of the interface between a Service Switching Point and an Intelligent Peripheral or Service Circuit Node. GR-1129 provides a more formally-defined and feature rich way of providing voice service circuit access to applications running on an SCP. Generally, a network provider wishing to implement GR-1129 must purchase these specific features from the SSP vendor. More information on GR-1129 is available in Bellcore, "AINGR: Switch—Intelligent Peripheral Interface," GR-1129-CORE, Issue 3, Revision 1, October 1998, said document being incorporated herein by reference in its entirety.

The basic system architecture was described above with reference to FIG. 1. Additionally, there is a Primary Rate Interface (PRI) trunk group, provisioned with GR-1129 capabilities, terminating on IP 36. Furthermore, TCP/IP connection 42 is not necessary for this embodiment. Each subscriber has a call model within the SSP, wherein each call model has a finite set of states that a call goes through. One of the trigger points is "off hook," when a caller picks up the receiver to initiate a telephone call.

Referring to FIG. 2 and describing this invention by way of example, the subscriber or calling party picks up telephone 18a. Upon encountering the off-hook trigger, SSP 14 needs to obtain further instructions from other network elements. SSP 14 sends an SS-7 Transaction Capabilities Application Part (TCAP) message to SCP 24 via STP 22 to request instructions. SCP 24 receives this request along with information about the subscriber associated with telephone 18a and calling line 40a, such as the state of the call, the subscriber's calling line number, and that telephone 18a just went off hook. In response to the query by SSP 14, SCP 24 identifies the subscriber by performing a search of database 26. During this search, SCP 24 examines the feature list of the subscriber and determines that the subscriber has subscribed to VAD service. SCP 24 then provides instructions to SSP 14 that the communication is to be routed to SSP 16. In an embodiment, the subscriber may indicate that it wishes to use VAD service by dialing a feature code, such as *TALK or #411, or directory number, which is well understood by those skilled in the art.

A call path, a PRI with ISDN signaling, is established between telephone 18a and SSP 16, which then routes the communication to IP 36. IP 36 is an intelligent peripheral, such as a SCN with voice recognition and processing capabilities. It is understood by those skilled in the art that other intelligent peripherals may also be used. IP 36 then prompts the subscriber to determine who the subscriber would like to call and collects an utterance, such as a spoken name or number, from the subscriber in a manner which is well known to those skilled in the art. IP 36 translates that utterance into a calling line number for a called party, which in this exemplary embodiment corresponds to the party associated with calling line 40b and telephone 18b, using a mapping database. Service logic within IP 36 is used to map the spoken word, phrase, or sound to the desired destination calling line number.

IP 36 instructs SSP 16 to route the call to the SSP serving the subscriber, SSP 14. Included with those instructions is a message with the destination calling line number. SSP 14 requests instructions from SCP 24 via STP 22. The request for instructions includes a TCAP return results message that contains the destination calling line number. In another embodiment, IP 36 could simply send to SCP 24 (via the SSPs and STP) a name or phrase uttered by the subscriber and the destination calling line number look-up could be performed by SCP 24 by accessing a database associated with the SCP.

Once SCP 24 is sent the destination calling line number by SSP 14, the call path between IP 36 and telephone 18a is dropped and the call is completed from SCP 24. Service logic in SCP 24 creates a response message instructing SSP 14 to route the call to the calling line number associated telephone 18b, and SSP 14 routes the communication to telephone 18b.

Although FIG. 2, and other exemplary environments and embodiments discussed herein, shows telephones 18a and 18b (and calling lines 40a and 40b) being served by the same SSP, one skilled in the art would understand that these calling lines could be served by different SSPs. Likewise, IP 36 and telephone 18a could be served by the same SSP, or telephones 18a and 18b and IP 36 could all be served by the same SSP or each by a different SSP. The overall efficiencies gained over presently existing systems of operation for voice activated dialing include that the present invention requires only half the ports (and thus half the cost) as prior systems because this invention eliminates double trunking, removing the need for the user to have two cords going through the IP platform in order to utilize the VAD service and complete the call. Additionally, the present invention preserves subscriber billing and IXC preferences.

Referring to FIG. 3, an exemplary method of operation by which VAD service is used with respect to originating a communication from a calling party is described using a flow diagram. The process begins at the Start step 100, and in step 105, an originating trigger associated with a calling line is received in connection with a communication. Off hook is a typical originating trigger that occurs when a calling party lifts a phone receiver, in this example telephone 18a and calling line 40a shown in FIG. 2. At step 110, SSP 14 queries SCP 24 via STP 22 to obtain instructions from SCP 24. SSP 14 provides SCP 24 with information relating to the communication as part of the SSP's query to SCP 24.

In response to the query provided by SSP 14, at step 115, SCP 24 identifies the subscriber by performing a search in database 26, which was previously described with respect to FIG. 2. At step 120, after searching database 26 and recognizing that the subscriber had VAD service, SCP 24 provides instructions to SSP 14 to route the communication, via SSP 16, to IP 36. At step 125, IP 36 prompts the subscriber for speech to determine who the subscriber would like to call and translates that speech into a calling line number for a called party. In this example, the called party is associated with calling line 40b and telephone 18b.

At step 130, IP 36 instructs SSP 16 to route the communication back to SSP 14, with a message that includes the destination calling line number, and IP 36 drops out of the call. At step 135, SSP 14 again queries SCP 24, via STP 22, for instructions. SSP 14 provides SCP 24 with the destination calling line number as part of the SSP's query to SCP 24. In response to the query provided by SSP 14, at step 140, SCP 24 instructs SSP 14 to route the communication to the called party. The communication is then routed to the called party, corresponding to telephone 18b, at step 145.

Figure 4:
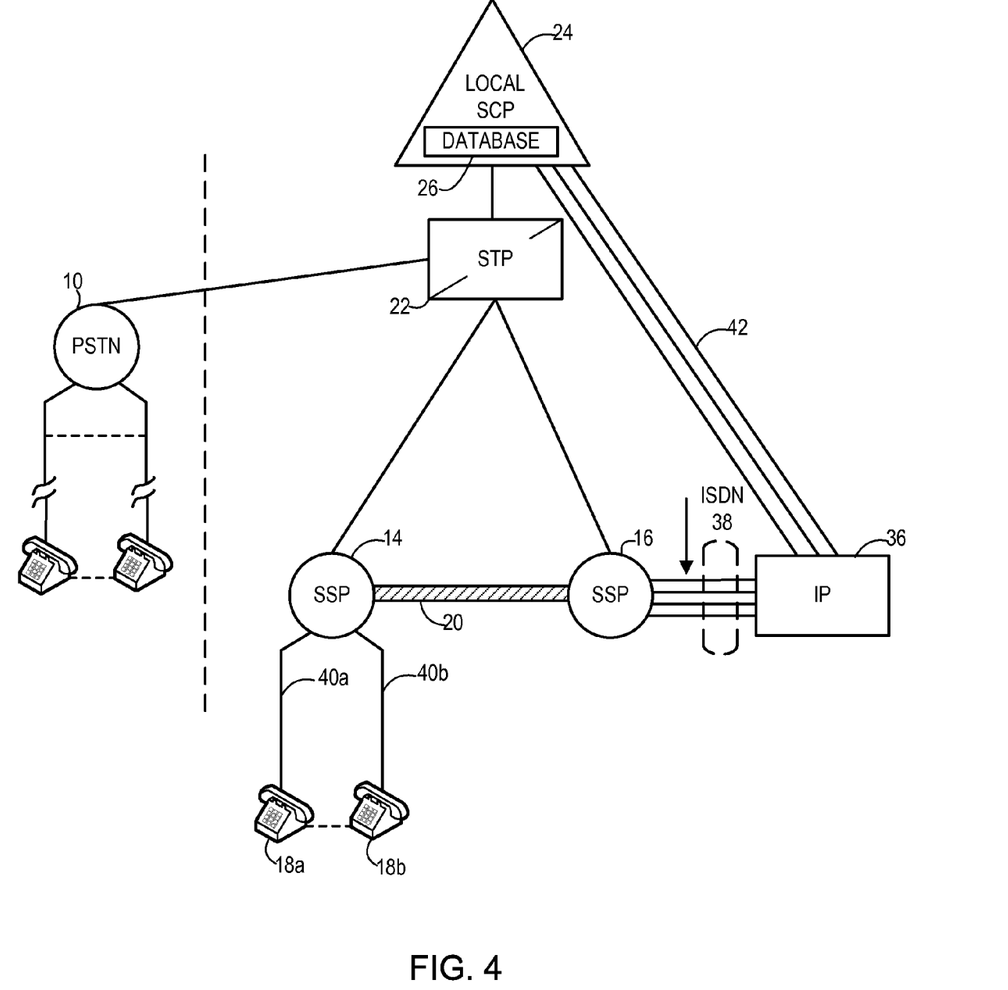
FIG. 4 is a block diagram of another exemplary embodiment operating in the exemplary environment in accordance with the present invention.
Figure 5:
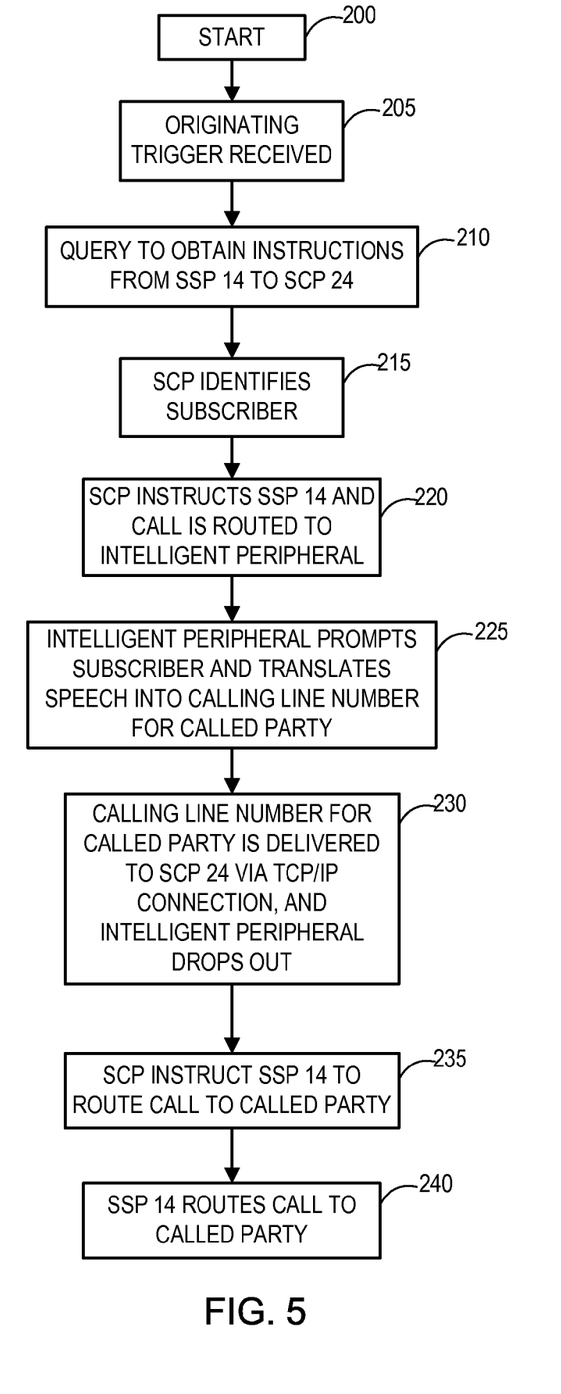
FIG. 5 is a flow diagram illustrating another exemplary method of operation of the present invention.

Second Exemplary Embodiment for Voice Activated Dialing Using an Intelligent Peripheral—FIGS. 4 and 5

Turning now to FIG. 4, another exemplary embodiment of the present invention is described in the context of a subscriber or calling party who has subscribed to VAD service using the service to place a call to a called party. The basic system architecture was described above with reference to FIG. 1, and this embodiment has features and advantages similar to the exemplary embodiment described with reference to FIGS. 2 and 3. However, this embodiment does not require that the AIN be provisioned with GR-1129 capabilities. Additionally, the exemplary environment includes a TCP/IP connection 42 for communication via the Internet or another appropriate network, as shown in FIG. 4, and a PRI trunk group terminates on IP 36.

Referring to FIG. 4 and describing this invention by way of example, SSP 14 receives the originating trigger and queries SCP 24 for instructions in the same or a similar manner as described above with reference to FIGS. 2 and 3. Likewise, in the same or a similar manner as described with reference to FIGS. 2 and 3, SCP 24 identifies the subscriber, determines that the subscriber has subscribed to VAD service, and instructs SSP 14 that the communication is to be routed to IP 36. IP 36 is an intelligent peripheral, such as a SCN with voice recognition and processing capabilities. It is understood by those skilled in the art that other intelligent peripherals may also be used.

IP 36 prompts the subscriber to determine who the subscriber would like to call and collects an utterance from the subscriber in a manner which is well known to those skilled in the art. IP 36 then translates that utterance into a calling line number for a called party, which in this exemplary embodiment corresponds to the party associated with calling line 40b and telephone 18b, using a mapping database. Service logic within IP 36 is used to map the spoken word, phrase, or sound to the desired destination calling line number. Rather than routing the call back to SCP 24 using SSPs 16 and 14 as described above with reference to FIGS. 2 and 3, IP 36 delivers the destination calling line number for the called party to SCP 24 via TCP/IP connection 42. In another embodiment, IP 36 could simply send to SCP 24 a name or phrase uttered by the subscriber and the destination calling line number look-up could be performed by SCP 24 by accessing a database associated with the SCP.

While numerous methods, which are understood by those skilled in the art, may be used by the SCP 24 to correlate the message from IP 36, an example is described below for illustrative purposes. In order for SCP 24 to correlate the message, which contains the destination calling line number, from IP 36 to the corresponding call context on SCP 24, a unique four-digit transaction ID may be used. The transaction ID may be created and maintained on SCP 24 from the time at which SSP 14 requests initial instructions from SCP 24 until IP 36 drops out of the call. When SCP 24 instructs SSP 14 to route the communication to IP 36, SCP 24 includes the transaction ID, which may be, for example, the last four digits of the directory number used to route the call to IP 36 initially. This implies that SSP 14 must be provisioned in such a way that IP 36 will be identified by the first six digits of the directory number in the message from SCP 24 to SSP 14. IP 36 extracts the transaction ID from the called party number parameter in the PRI connect message that occurs when a call path is established between SSP 14 and IP 36. Once IP 36 has mapped the spoken word or phrase to a destination calling line number, IP 36 sends the transaction ID to SCP 24, along with the destination calling line number, for correlation.

Once SCP 24 acknowledges receipt of the destination calling line number from IP 36, IP 36 drops out and the call is completed from SCP 24. Service logic in SCP 24 creates a response message instructing SSP 14 to route the call to the calling line number associated telephone 18b, and SSP 14 routes the communication to telephone 18b.

Referring to FIG. 5, an exemplary method of operation by which VAD service is used with respect to originating a communication from a calling party is described using a flow diagram. The process begins at the Start step 200, and in step 205, an originating trigger associated with a calling line is received in connection with a communication. At step 210, SSP 14 queries SCP 24 via STP 22 to obtain instructions from SCP 24. SSP 14 provides SCP 24 with information relating to the communication as part of the SSP's query to SCP 24.

In response to the query by SSP 14, at step 215, SCP 24 identifies the subscriber by performing a search in database 26, which was previously described with respect to FIG. 2. At step 220, after searching database 26 and recognizing that the subscriber had VAD service, SCP 24 provides instructions to SSP 14 to route the communication, via SSP 16, to IP 36. At step 225, IP 36 prompts the subscriber for speech to determine who the subscriber would like to call and translates that speech into a calling line number for a called party. In this example, the called party is associated with calling line 40*b* and telephone 18*b*.

At step 230, IP 36 delivers the destination calling line number for the called party to SCP 24 via TCP/IP connection 42, and IP 36 drops out of the call. At step 235, SCP 24 provides the destination calling line number to SSP 14 and instructs SSP 14 to route the communication to the called party. The communication is then routed to the called party, corresponding to telephone 18*b*, at step 240.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. In an advanced intelligent network, a method for using voice activated dialing (VAD) service with respect to originating a communication from a first calling line number, comprising:

encountering an originating trigger including a feature code and querying a service control point (SCP) to obtain instructions for routing the communication, wherein the SCP determines whether a calling line associated with the first calling line number is subscribed to VAD service;

if the calling line is subscribed to VAD service, establishing a call path between the calling line and an intelligent peripheral with voice recognition and processing capabilities, wherein the intelligent peripheral prompts collection of an utterance from the calling line, translates the utterance into identifying information associated with a called line and extracts a transaction identification (ID) from a called party parameter, wherein the transaction ID comprises a first plurality of digits in the first calling line number associated with the calling line used to establish the call path with the intelligent peripheral and wherein the intelligent peripheral is identified by a second plurality of digits in the first calling line number associated with the calling line used to establish the call path with the intelligent peripheral;

receiving a message that includes the identifying information at the SCP; and dropping the call path between the calling line and the intelligent peripheral when the SCP receives the first calling line number and transaction ID from the intelligent peripheral, wherein the transaction ID is created and maintained on the SCP from the time the query is made to the SCP to obtain instructions for routing the communication until the call path between the calling line and the intelligent peripheral is dropped, and completing the communication between the calling line and the called line, wherein the SCP instructs a service switching point to route the communication to a called party.

2. The method of claim 1, wherein the advanced intelligent network has GR-1129 capabilities.

3. The method of claim 2, wherein the message is from the intelligent peripheral.

4. The method of claim 3, wherein dropping the call path further comprises querying the SCP to obtain instructions for routing the communication and providing information about the identifying information to the SCP.

5. The method of claim 1, wherein the intelligent peripheral transmits the identifying information to the SCP via a TCP/IP connection.

6. The method of claim 1, wherein the intelligent peripheral utilizes a mapping database to translate the utterance into the identifying information.

7. The method of claim 1, wherein the identifying information is a second calling line number.

8. The method of claim 1, wherein the identifying information is a called party name.

9. The method of claim 1, wherein the SCP analyzes a call directed to the feature code from the calling line to determine whether the calling line is subscribed to VAD service.

10. The method of claim 1, wherein the call path is a primary rate interface with ISDN signaling.

11. In an advanced intelligent network with GR-1129 capabilities, a system for using voice activated dialing (VAD) service with respect to originating a communication from a first calling line number, comprising:

a service control point (SCP) having VAD capability and being operative to determine that a calling line associated with the first calling line number is subscribed to VAD service;

in connection with the determination, the SCP being operative to instruct a service switching point (SSP) to route the communication to an intelligent peripheral;

the intelligent peripheral being operative to prompt collection of an utterance from the calling line and translate the utterance into identifying information associated with a called line and extract a transaction identification (ID) from a called party parameter, wherein the transaction ID comprises a first plurality of digits in the first calling line number associated with the calling line used to establish a call path with the intelligent peripheral and wherein the intelligent peripheral is identified by a second plurality of digits in the first calling line number associated with the calling line used to establish the call path with the intelligent peripheral;

upon translation of the utterance, the intelligent peripheral being operative to route the communication to the SSP, including therewith a message containing the identifying information;

the SSP being operative to query the SCP for instructions to route the communication and provide the identifying information to the SCP; and upon receiving the query from the SSP, the SCP being operative to instruct the SSP to complete the communication between the calling line and the called line, wherein the transaction ID is created and maintained on the SCP from the time the query is made to the SCP to obtain instructions for routing the communication until the call path between the calling line and the intelligent peripheral is dropped.

12. The system of claim 11, wherein the identifying information is a second calling line number.

13. The system of claim 11, further comprising the SCP being operative to analyze a call directed to a feature code from the calling line to determine whether the calling line is subscribed to VAD service.

14. The system of claim 11, further comprising the intelligent peripheral being operative to utilize a mapping database to translate the utterance into the identifying information.

15. The system of claim 11, wherein the intelligent peripheral is a service circuit node.

16. In an advanced intelligent network with GR-1129 capabilities, a method for preserving billing and interexchange carrier preferences of a subscriber using voice activated dialing (VAD) service with respect to originating a communication from a first calling line number, comprising:
 receiving an indication including a feature code that a calling line associated with the first calling line number has VAD service;
 establishing a call path between the calling line and an intelligent peripheral with voice recognition and processing capabilities;
 prompting collection of an utterance from the calling line, wherein the utterance is translated into identifying information associated with a called line;
 receiving a message from the intelligent peripheral that includes the identifying information and dropping the call path between the calling line and the intelligent peripheral, wherein identification information includes a transaction identification (ID) extracted from a called party parameter, wherein the transaction ID comprises a first plurality of digits in the first calling line number associated with the calling line used to establish the call path with the intelligent peripheral and wherein the intelligent peripheral is identified by a second plurality of digits in the first calling line number associated with the calling line used to establish the call path with the intelligent peripheral;
 sending communication routing instructions from a service control point (SCP) to a service switching point (SSP); and
 completing the communication between the calling line and the called line using the communication routing instructions, wherein completing the communication comprises querying the SCP to obtain instructions for routing the communication and providing the identifying information to the SCP, wherein the transaction ID is created and maintained on the SCP from the time the SCP is queried to obtain the routing instructions until the call path between the calling line and the intelligent peripheral is dropped.

17. The method of claim 16, wherein the identifying information is a second calling line number.

18. The method of claim 16, wherein receiving the indication further comprises analyzing a feature list associated with the calling line and recognizing that the calling line is subscribed to VAD service.

19. The method of claim 16, wherein the call path is a primary rate interface with ISDN signaling.

20. The method of claim 16, wherein prompting further comprises using a mapping database to translate the utterance into the identifying information.

21. The method of claim 16, wherein the SCP and SSP serve the calling line.

22. In an advanced intelligent network, a system for using voice activated dialing (VAD) service with respect to originating a communication from a first calling line number, comprising:
 a service control point (SCP) being operative to analyze a call directed to a feature code from a calling line to determine whether the calling line associated with the first calling line number is subscribed to VAD service;
 in connection with the determination, the SCP being operative to instruct a service switching point (SSP) to route the communication to an intelligent peripheral;
 the intelligent peripheral being operative to prompt collection of an utterance from the calling line and translate the utterance into identifying information associated with a called line and extract a transaction identification (ID) from a called party parameter, wherein the transaction ID comprises a first plurality of digits in the first calling line number associated with the calling line used to establish a call path with the intelligent peripheral and wherein the intelligent peripheral is identified by a second plurality of digits in the first calling line number associated with the calling line used to establish the call path with the intelligent peripheral;
 upon translation of the utterance, the intelligent peripheral being operative to deliver the identifying information to the first network element; and
 the SCP being operative to instruct the SSP to route the communication to the called line, wherein the transaction ID is created and maintained on the SCP from the time the SCP is queried to obtain the routing instructions to the intelligent peripheral until the call path between the calling line and the intelligent peripheral is dropped.

23. The system of claim 22, wherein the identifying information is a second calling line number.

24. The system of claim 22, further comprising the intelligent peripheral being operative to utilize a mapping database to translate the utterance into the identifying information.

25. The system of claim 22, wherein the intelligent peripheral is a service circuit node.

26. The system of claim 22, wherein the intelligent peripheral delivers the identifying information to the SCP via a TCP/IP connection.

27. In an advanced intelligent network, a method for preserving billing and interexchange carrier preferences of a subscriber using voice activated dialing (VAD) service with respect to originating a communication from a first calling line number, comprising:
 receiving an indication including a feature code that a calling line associated with the first calling line number has VAD service;
 establishing a call path between the calling line and an intelligent peripheral with voice recognition and processing capabilities;
 prompting collection of an utterance from the calling line, wherein the utterance is translated into a second calling line number associated with a called line;
 receiving a message that includes the second calling line number and a transaction identification (ID) extracted from a called party parameter and dropping the call path between the calling line and the intelligent peripheral, wherein receiving the message comprises the intelligent peripheral delivering the identifying information to a service control point (SCP) and the SCP providing routing instructions to a service switching point (SSP), wherein the transaction ID comprises a first plurality of digits in the first calling line number associated with the calling line used to establish the call path with the intelligent peripheral, and wherein the intelligent peripheral is identified by a second plurality of digits in the first calling line number associated with the calling line used to establish the call path with the intelligent peripheral;

sending communication routing instructions from an SCP to an SSP; and completing the communication between the calling line and the called line using the communication routing instructions, wherein completing the communication comprises querying the SCP to obtain instructions for routing the communication and providing the identifying information to the SCP, wherein the transaction ID is created and maintained on the SCP from the time the SCP is queried to obtain the routing instructions until the call path between the calling line and the intelligent peripheral is dropped.

28. The method of claim 27, wherein the identifying information is a second calling line number.

29. The method of claim 27, wherein receiving the indication further comprises analyzing a feature list associated with the calling line and recognizing that the calling line is subscribed to VAD service.

30. The method of claim 27, wherein prompting further comprises using a mapping database to translate the utterance into the identifying information.

* * * * *